Apr. 17, 1923.

W. H. CONBOY

VALVE CAP

Filed Aug. 18, 1922

1,452,146

Inventor
W. H. Conboy
By Hull, Brock & West
Attys.

Patented Apr. 17, 1923.

1,452,146

UNITED STATES PATENT OFFICE.

WILLIAM H. CONBOY, OF CHEBOYGAN, MICHIGAN.

VALVE CAP.

Application filed August 18, 1922. Serial No. 582,636.

*To all whom it may concern:*

Be it known that I, WILLIAM H. CONBOY, a citizen of the United States, residing at Cheboygan, in the county of Cheboygan and State of Michigan, have invented a certain new and useful Improvement in Valve Caps, of which the following is a full, clear, and exact description, reference being had to the accompanying drawings.

This invention relates to an improved valve cap for use on the valve stems of pneumatic tires of automobiles and other vehicles.

The objects of the invention are to provide a comparatively simple and inexpensive valve cap which is very durable and practically indestructible and through which an absolutely positive seal of the valve stem may be readily effected through a simple and easy manipulation of the cap.

Figure 1:
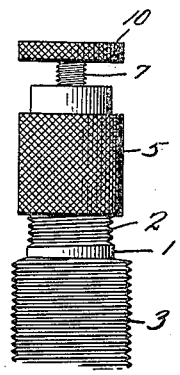
Figure 2:
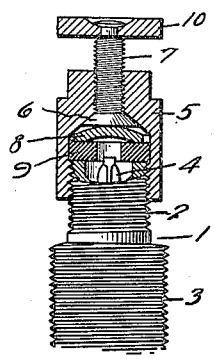
Figure 3:
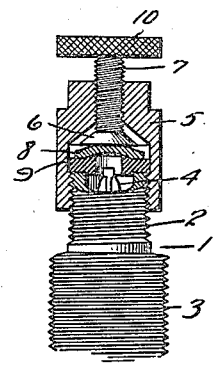
Figure 4:
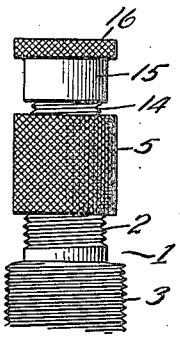
Figure 5:
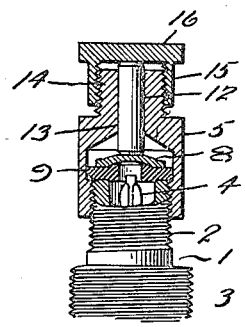

With these objects in view my invention may be defined as consisting of the combination and arrangement of parts set forth in the claims annexed hereto and illustrated in the accompanying drawing wherein Fig. 1 is an elevation of my improved valve cap applied to the valve stem of a pneumatic tire; Fig. 2 shows the cap in central section applied to the valve stem before the packing element or sealing gasket is compressed; Fig. 3 is a view similar to Fig. 2 showing the parts in sealing condition; and Figs. 4 and 5 are views similar to Figs. 1 and 3, respectively, showing a modified form of the invention.

For clearness, the parts are shown in the accompanying drawing on a scale considerably enlarged over the prevailing dimensions of standard valve stems and caps.

Throughout the several views, the valve stem is designated 1 and it is provided with threaded portions 2 and 3 for the reception of the valve cap and cover, respectively, common to the valve stems of the character herein illustrated. The upper end of the stem is broken away in Figs. 2, 3 and 5 to reveal the valve pin 4.

In the form of the invention illustrated in Figs. 1, 2 and 3 the valve cap is composed of a body portion 5 that is recessed to receive the head 6 of a screw 7, a pressure plate 8 that is located immediately below the head, and a compressible packing element or sealing gasket 9. The body portion is internally threaded below the gasket for cooperation with the threaded portion 2 of the valve stem. The screw 7 is threaded through the upper end of the body portion and has secured to its outer end a thumb nut 10. The gasket 9 is of sufficient diameter to expand above the threads of the body portion into contact with the walls thereof so as to be held against dislodgment within the cap and to maintain in place the pressure plate 8. The pressure plate is shown as concavo-convex with its convexed side bearing upon the head 6 of the screw 7, while the entire peripheral portion of its concaved side engages the packing element or gasket 9 in opposed relation to the end of the valve stem, when the cap is applied.

In applying the cap, it is screwed upon the stem until the packing element or gasket engages the end of the stem, as illustrated in Fig. 2, and then the operator, by turning the thumb nut 10, projects the screw 7 inwardly to depress the pressure plate 8 and compress the gasket 9 between the pressure plate and the end of the valve stem, as shown in Fig. 3. Thus, a very secure sealing of the valve stem is effected.

As illustrated, the packing element or gasket 9 has a central aperture for the accommodation of the valve pin 4, although obviously the same might be in the form of a disk with a central recess to receive the end of the stem so that by no chance would the packing element engage the valve pin and unseat the valve.

The form of the invention shown in Figs. 4 and 5 is distinguished from that above described by the substitution for the screw 7 of a push rod 12 which is slidable through a bore 13 in the externally threaded reduced upper end 14 of the body portion 5, and a sleeved nut 15 is threaded on the part 14 and has a head 16 that engages the outer end of the push rod 12.

The operation of this form of the invention will be readily understood from its construction and its similarity of operation to that of the previous form.

It will be seen from the foregoing that my invention provides a simple valve cap that is very convenient of manipulation and which will thoroughly seal a valve stem and effectively prevent leakage of air even though the valve proper may be defective or worn out. Furthermore, the fact that no turning of the gasket 9, while in contact with the end of the stem, is necessary prevents the gasket from becoming chafed or worn by continual use wherefore it will last indefinitely.

Having thus described my invention, what I claim is:

1. A cap for the valve stems of pneumatic tires comprising a recessed body portion for application to the stem, a compressible packing element within the body portion for engagement with the end of the stem, and means for compressing the packing element independently of any manipulation of the body portion.

2. A cap for the valve stems of pneumatic tires comprising a recessed body portion for application to the stem, a compressible packing element within the body portion for engagement with the end of the stem, and means carried by and movable independently of the body portion for compressing the packing element.

3. A cap for the valve stems of pneumatic tires comprising a recessed body portion for application to the stem, a member contained within the body portion and movable longitudinally thereof, a compressible packing element adjacent said member and arranged to engage the end of the valve stem, and means for moving the member thereby to compress the packing element between said member and the end of the valve stem.

4. A cap for the valve stems of pneumatic tires comprising a recessed body portion for application to the stem, a concavo-convexed pressure plate within the recess of the body portion and having its concaved side facing the open end of the body portion, a compressible packing element disposed adjacent the pressure plate and arranged to engage the end of the valve stem, and a screw threaded through the end of the body portion for engagement with the pressure plate, as and for the purpose specified.

5. A cap for the valve stems of pneumatic tires comprising a recessed body portion for application to the stem, a concavo-convexed pressure plate within the recess of the body portion and having its concaved side facing the open end of the body portion, a compressible packing element disposed adjacent the pressure plate and arranged to engage the end of the valve stem, the body portion having a bore through its end opposite the open end of its recess, a member occupying said bore and engaging the pressure plate, and means for projecting said member inwardly thereby to compress the packing element between the pressure plate and the end of the valve stem.

6. A cap for the valve stems of pneumatic tires comprising a recessed body portion internally threaded adjacent the open end of its recess for application to the threaded end of the stem, a compressible packing element within the recess immediately inside the threaded portion, a concavo-convexed pressure plate having its peripheral portion engaging the corresponding portion of the inner side of the packing element, a screw threaded through the end of the body portion opposite the open end of its recess, said screw having a head engaging the convexed side of the pressure plate, and a thumb nut applied to the outer end of the screw by means of which the screw may be rotated thereby to depress the pressure plate and compress between its peripheral portion and the opposed end of the valve stem the aforesaid packing element.

7. A cap adapted to be applied to the end of a valve stem, a packing element within the cap for engagement with the end of the stem, an imperforate plate engaging the side of the packing element opposite that which engages the valve stem, said plate having a diameter greater than the internal diameter of the stem, and means for depressing the plate thereby to compress the packing element between the plate and the end of the stem.

In testimony whereof, I hereunto affix my signature.

WILLIAM H. CONBOY.